A. DAWSON.
PHOTOGRAPHIC CAMERA.
APPLICATION FILED DEC. 30, 1916.

1,299,431.

Patented Apr. 8, 1919.

Alfred Dawson
INVENTOR
By Seward Davis ATTY.

UNITED STATES PATENT OFFICE.

ALFRED DAWSON, OF KENT, ENGLAND.

PHOTOGRAPHIC CAMERA.

1,299,431.  Specification of Letters Patent.  Patented Apr. 8, 1919.

Original application filed February 21, 1913, Serial No. 749,877 Divided and this application filed December 30, 1916. Serial No. 139,913.

*To all whom it may concern:*

Be it known that I, ALFRED DAWSON, a subject of the King of Great Britain and Ireland, residing in Kent, England, have invented new and useful Improvements in Photographic Cameras, of which the following is a specification.

This invention which is a division from the subject matter of Patent No. 1214016, dated January 30, 1917, relates to cameras employed in the art of photography and more particularly to cameras which are used in the production of natural color negatives, and wherein a plurality of sensitive surfaces are exposed simultaneously in the camera through one lens.

The invention consists in providing the camera with plane-parallel light-transmitting elements whose planes bisect one another on the optical axis of the lens, so that the light passing through the lens is either transmitted or reflected onto the various sensitized plates or surfaces.

The invention can be more readily understood by reference to the accompanying drawings, in which—

Figure 1:
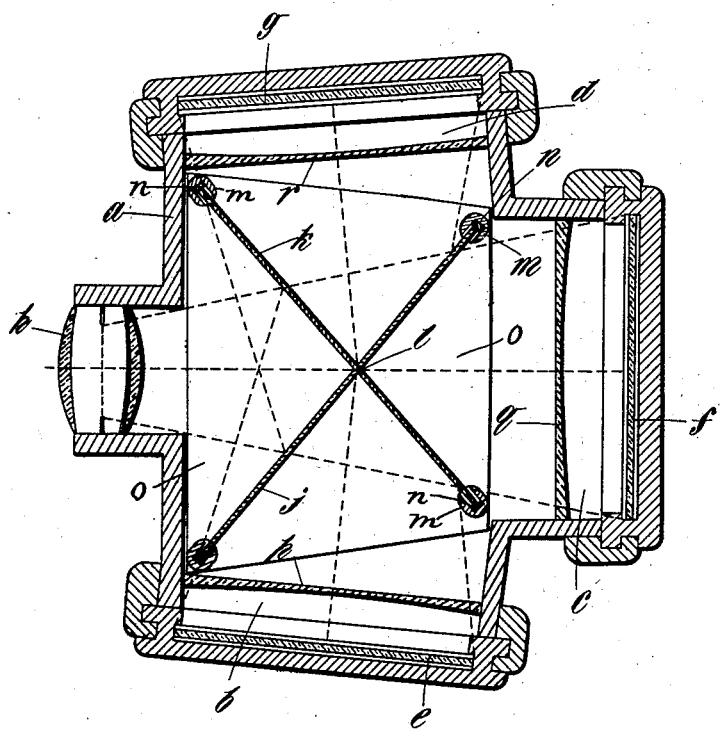
Figure 1 is a section through a camera provided with three pockets for holding negative plates.

The frame $a$ of the camera is fitted with three pockets $b$, $c$, and $d$, in which are shown three negative plates $e$, $f$ and $g$. The lens is shown at $h$, through which the rays of light pass to a group of light-transmitting or reflecting elements composed of two thin plane-parallel plates $j$, and $k$, whose planes bisect one another at $l$ on the optical axis of the lens. The cruciform arrangement of the elements $j$ and $k$ may be accomplished by merely slotting them together. The outer edges of the light-transmitting elements are conveniently embraced by channeled posts $m$ packed with elastic material $n$ for urging them into close contact at the central bisecting joint. The said posts are secured to plates $o$ disposed at the upper and lower ends respectively of the several posts. In the drawing the lower plate is shown. The top and bottom edges of the elements fit into grooves plowed to a proper depth at the correct angle in each of the plates $o$, the said elements $j$ and $k$ being thereby snugly fitted. When the posts, elements and plates are assembled they form a cage which can be bodily inserted in and withdrawn from the camera by a suitable construction of the body.

The rays of light in passing through the plates $j$ and $k$ become refracted which produces a distorted image on the sensitive surfaces. Consequently correctors $p$, $q$, and $r$, having one or both surfaces curved are placed in position between the respective sensitive surfaces and the light transmitting or reflecting plates $j$ and $k$ so as to overcome this objection.

Figure 2:
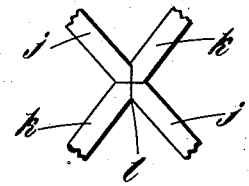
Fig. 2 is an enlarged detail taken at the point of bisection of the light-transmitting or reflecting elements.

In Fig. 2 another method is shown of connecting the plates $j$ and $k$, other than that already described in this case. Each element is formed in two parts, the adjacent ends of which are prismatic in form and ground or worked to fit correctly. In some cases the ground or worked prismatic edges are blackened to prevent fogging at the centers of the sensitive plates.

It is desired to keep the elements $j$ and $k$ as thin as compatible with the size of the camera.

In operation, the light reaching the sensitive surface $f$ passes through the front portions of the plates $j$ and $k$ and then through their rear portions and the corrector $q$. Thus the light reaching the sensitive surface $e$ is reflected from the plate $k$ through the corrector $p$ and the light reaching the sensitive surface $g$ is reflected from the plate $j$ through the corrector $r$.

By this invention the camera can be made much smaller than those hitherto made for accomplishing the same object.

Having thus described my invention, I claim:—

1. In a photographic camera for use in the production of negatives in natural color the combination, with a single objective or lens, of two plane-parallel light-transmitting and reflecting elements arranged obliquely to each other, so that the planes thereof bisect one another on the optical axis of the lens.

2. In a photographic camera for use in the production of negatives in natural color the combination, with a single objective or lens, of a plurality of pockets for sensitive plates and two plane-parallel light-transmitting and reflecting elements, whereof the planes bisect one another on the optical axis of the lens.

3. In a photographic camera for use in the production of negatives in natural color the combination, with a single objective or lens, of a plurality of pockets for sensitive plates, two plane-parallel light-transmitting and reflecting elements whereof the planes bisect one another on the optical axis of the lens and means for correcting distortion disposed between the light-transmitting and reflecting elements and the sensitive plates.

4. In a photographic camera for use in the production of negatives in natural color the combination, with a single objective or lens, of a plurality of pockets for sensitive plates, two plane-parallel light-transmitting and reflecting elements whereof the planes bisect one another on the optical axis of the lens and a plano-concave corrector disposed between the light-transmitting and reflecting elements and each sensitive plate.

5. In a photographic camera for use in the production of negatives in natural color the combination, with the lens, of a plurality of pockets for sensitive plates, two plane-parallel light-transmitting and reflecting elements whereof the planes bisect one another in the optical axis of the lens, channeled posts for embracing the edges of said elements, elastic packing in said posts in contact with the said element edges and grooved plates for receiving the edges of the elements not embraced by said channeled posts and for securing the said channeled posts and elements in position.

6. In a photographic camera for use in the production of negatives in natural color the combination, with a single objective or lens, of a plurality of pockets for sensitive plates, two plane-parallel light-transmitting and reflecting elements whereof the planes bisect one another on the optical axis of the lens, channeled posts for embracing the edges of said elements, elastic packing in said posts in contact with the said element edges and grooved plates for receiving the edges of the elements not embraced by the said channeled posts and for securing the said channeled posts and elements in position and means for correcting distortion disposed between the said elements and the pockets for the sensitive plates.

7. In a photographic camera for use in the production of negatives in natural color the combination, with a single objective or lens, of a plurality of pockets for sensitive plates, two plane-parallel light-transmitting and reflecting elements whereof the planes bisect one another on the optical axis of the lens, channeled posts for embracing the edges of the said elements, elastic packing in said posts in contact with said element edges, grooved plates for receiving the edges of said elements not embraced by said channeled posts and for securing the said channeled posts and elements in position and a plano-concave corrector disposed between the said light-transmitting and reflecting elements and each pocket for the sensitive plate.

8. In a photographic camera for use in the production of negatives in natural color the combination, with an objective or lens, of two plane-parallel light-transmitting and reflecting elements each composed of two parts whereof the meeting edges at the point of bisection of the planes thereof are prismatic in form and their surfaces are ground or worked to a correct fit.

ALFRED DAWSON.